Nov. 15, 1932.  R. GUNN  1,887,713
ELECTROMECHANICAL COUPLING DEVICE
Filed Jan. 21, 1932
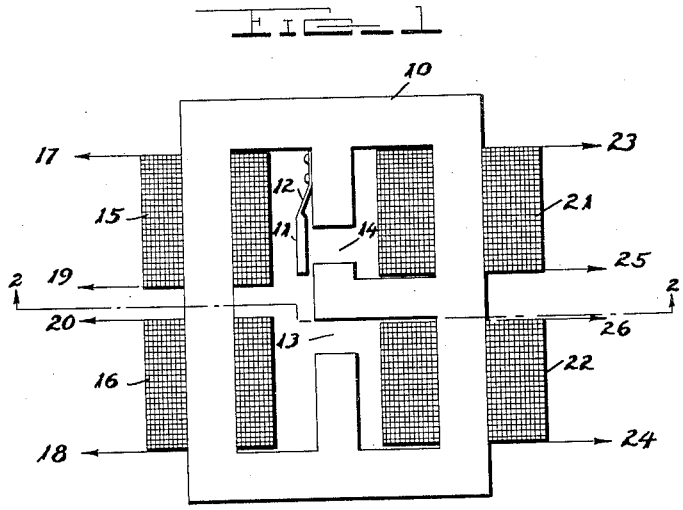
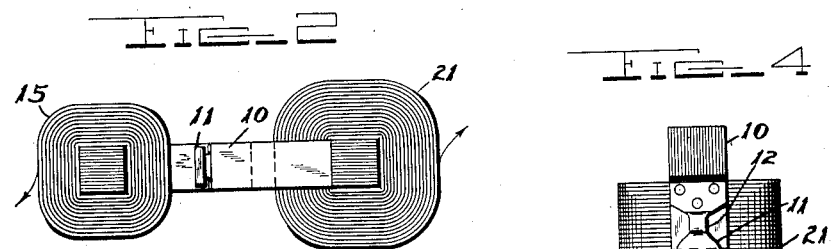
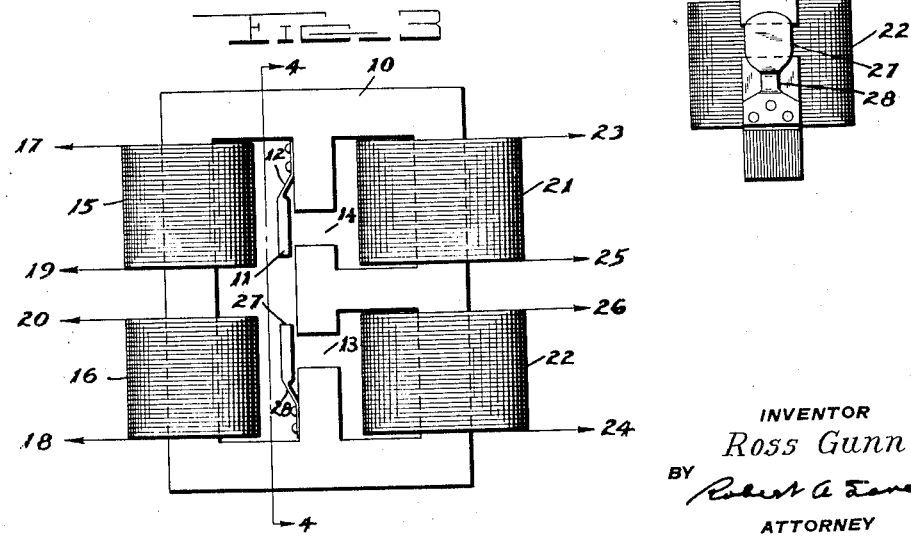
INVENTOR
Ross Gunn
BY
ATTORNEY Patented Nov. 15, 1932

1,887,713

UNITED STATES PATENT OFFICE

ROSS GUNN, OF WASHINGTON, DISTRICT OF COLUMBIA

ELECTROMECHANICAL COUPLING DEVICE

Application filed January 21, 1932. Serial No. 587,915.

(GRANTED UNDER THE ACT OF MARCH 3, 1883, AS AMENDED APRIL 30, 1928; 370 O. G. 757)

This invention relates to electro-mechanical coupling devices, and more particularly to differential electro-mechanical coupling devices sharply selective as to frequency.

The objects of my invention are, first, to provide an electro-mechanical coupling device that will pass electrical energy of a predetermined frequency but will be practically opaque to electric energy of a frequency slightly different from the predetermined frequency;

Second, to provide an electro-mechanical coupling device that will pass electric energy of two predetermined and slightly different frequencies but will be practically opaque to electrical energy of a frequency slightly different from the predetermined frequencies and to that of a narrow band of frequencies between them.

With these and other objects in view, my invention consists of a construction and arrangement of parts as will be more fully described hereinafter, in connection with the accompanying drawing, in which:

Fig. 1 shows two primary coils and two secondary coils wound upon a core of paramagnetic material, having two air gaps, with a vibrator mounted near one gap;

Fig. 2 is a cross-section on line 2—2 of the coupling device shown in Fig. 1;

Fig. 3 shows two primary coils and two secondary coils wound upon a core of paramagnetic material, having two air gaps, with a vibrator mounted near each air gap;

Fig. 4 is a cross-section on line 4—4 of the coupling device shown in Fig. 3.

Similar numerals refer to similar parts throughout the several views.

Referring to Figs. 1 and 2, numeral 10 designates a core of para-magnetic material which is so divided that the reluctance of certain sections may be changed rapidly as electrical energy of a predetermined frequency is applied. This is accomplished by arranging an armature 11 of a para-magnetic material, which is supported by a spring 12, in such a manner that the air gap 14 of the magnetic circuit is varied as the combination 11 and 12 vibrates. The air gap 13 is so constructed that its reluctance approximates the reluctance of the magnetic path of the air gap 14 and vibrator 11, 12. The primary circuit which is connected to the incoming signal is shown by coils 15 and 16 that are alike and terminals 17, 18, 19 and 20. These coils may be connected in series or parallel, as desired. This primary winding may be a single coil but the two coils as shown give a more flexible device. The secondary coils 21 and 22 with their terminals 23, 24, 25 and 26 are connected differentially, that is, they are connected so that a change of flux in core 10 produces no net electromotive force across the output terminals of these coils, so long as the reluctance of gap 13 and gap 14 with vibrator 11 remains approximately equal. It is evident that for such a result coils 21 and 22 will have to be exactly alike as regards size, number of turns, etc., except that they may be wound in opposite directions. If they are wound in the same direction then either terminals 23 and 26 or 24 and 25 may be joined to obtain the differential connection and then corresponding terminals 24 and 25 or 23 and 26 would be the output terminals; and if they are wound in opposite directions, the terminals 25 and 26 will be joined to obtain the differential connection and terminals 23 and 24 will be the output terminals. When electric energy of a frequency equal to the vibration frequency of the vibrator 11, 12, is impressed on the primary, the relative reluctance of the two secondary magnetic paths will change and the relative net flux interlinking each coil will be changed accordingly. When the vibrator 11 moves into gap 14, the reluctance of that gap is decreased, thereby decreasing the flux threading coil 21 but maintaining the flux threading coil 22 substantially the same, but when the vibrator moves away from gap 14, the reluctance of that gap is increased, thereby increasing the flux threading coil 21 but maintaining the flux threading coil 22 substantially the same. Thus, a net electromotive force will appear across the terminals of the differentially connected secondary coils of a frequency equal to the vibrational frequency of the vibrator system. It is evident that a device of this type will pass electrical energy of but one frequency, that of the natural frequency of the tuned vibrator. Such a device will shut out frequencies that differ from the natural period of the vibrator by a slight amount. Tests with certain frequencies have shown a difference of 7% is sufficient.

An enlargement of this arrangement is illustrated in Figs. 3 and 4. Here two vibrators are used, the coil being connected as before. Vibrator 27, 28 associated with gap 13 has a natural frequency slightly different from that of vibrator 11, 12 associated with gap 14. The reluctance of the secondary magnetic paths are equal for frequencies removed from the natural frequency of either vibrator, but when the resonant frequency of the first vibrator is approached and that vibrator begins to vibrate, there will be a change in the reluctance of the secondary paths and a net electromotive force will appear across the terminals of the differentially connected secondary coils. As the frequency is changed further, a frequency will be found where both vibrators vibrate equally, their natural periods being close, and here the reluctance of the secondary paths are again equal and the net electromotive force across the terminals of the secondary coils will be zero. A further change of frequency approaching the resonant frequency of the second vibrator will again produce a change in the reluctance of the secondary paths and a net electromotive force across the terminals of the secondary coils. In this manner a zero effect can be attained at one predetermined frequency, while nearby frequencies both above and below will produce a large effect.

The possible arrangement of this device in connection with a vacuum tube bridge circuit is of particular importance, terminals 25 and 26 being connected to the filaments of the vacuum tube 3 and terminals 23 and 24 being respectively connected to the grids of these tubes. As the frequency of the electric energy impressed on the primary coils is changed, the bridge will first be unbalanced in one direction as the first vibrator goes through its natural frequency, and then be unbalanced in the opposite direction as the second vibrator goes through its natural frequency. A strict balance point will be found at a mid-point between these two unbalanced conditions. It is therefore possible to control any desired system in this manner by a very small change in frequency of the impressed electrical energy.

Such a coupling device as has been described is suitable for coupling vacuum tube amplifiers or any similar electrical circuits. This type of coupling is desirable in aircraft where ignition interference is large or in ordinary telegraphic communications where severe static is encountered. The particular use for which this device is adapted is in those problems relating to remote or radio control of mobile objects. The present modification is more selective than the device disclosed in my Patent No. 1,821,181. Tests have shown that it will differentiate between frequencies separated by less than 3 per cent.

It will be understood that the above description and accompanying drawing comprehend only the general and preferred embodiment of my invention and that minor changes in the details of the construction and arrangement of parts may be made within the scope of the appended claims without sacrificing any of the advantages of this invention.

The invention herein described may be manufactured and used by or for the Government of the United States of America for governmental purposes without the payment of any royalties thereon.

I claim:

1. A coupling device comprising a magnetic core, a primary winding wound upon said core, two secondary windings wound upon said magnetic core and connected differentially, means for by-passing from the secondary coils a part of the flux created by electrical energy in the primary coil, and means for varying the amount of flux so by-passed from one of said secondary windings.

2. A coupling device comprising a magnetic core, a primary winding wound upon said core, two secondary windings wound upon said magnetic core and connected differentially, means for shunting from each secondary winding a part of the flux created by electrical energy in the primary winding, the reluctance of said shunting means normally being substantially equal, and means for rapidly varying the amount of flux so shunted from one of said secondary windings when the primary winding is energized by electrical energy of a predetermined frequency.

3. A transformer, comprising a magnetic core, a primary winding upon said core, two secondary windings wound upon said core and connected differentially, a magnetic shunt across each secondary winding with an air gap therein, and a spring-mounted magnetic armature disposed opposite one of said air gaps, said armature being normally in equilibrium but being readily set into vibration by electrical energy in the primary winding of a frequency equal to the natural period of the armature.

4. A coupling device, comprising a magnetic core, a primary winding wound upon said core, two secondary windings wound upon said core and connected differentially, means for shunting from the secondary windings a part of the flux created by electrical energy in the primary winding, and means for varying the amount of flux so shunted from one of said secondary windings which functions when the electrical energy in the primary winding has a predetermined frequency.

5. A coupling device, comprising a magnetic core, a primary winding wound upon said core, two secondary windings wound upon said core and connected differentially, means for by-passing from the secondary windings a part of the flux created by electrical energy in the primary winding, and means for varying the amount of flux so by-passed from each of said windings.

6. A coupling device, comprising a magnetic core, a primary winding wound upon said core, two secondary windings wound upon said core and connected differentially, means for shunting from each secondary winding a part of the flux created by electrical energy in the primary winding, the reluctance of said shunting means normally being substantially equal, and means associated with each shunting means for rapidly varying the amount of flux so shunted from its associated secondary winding when the primary winding is energized by electrical energy of a corresponding separate predetermined frequency.

7. A coupling device comprising a magnetic core, two primary windings wound upon said core and connected in series or parallel, two secondary windings wound upon said core and connected differentially, a magnetic shunt across each secondary winding with an air gap therein, and a spring-mounted magnetic armature disposed opposite each of said air gaps, said armatures being normally in equilibrium, but each being readily set into vibration by electrical energy in the primary winding of a frequency equal to its own natural period.

8. A transformer comprising a magnetic core, a primary winding wound upon said core, two secondary windings wound upon said core and connected differentially, means for shunting from the secondary windings a part of the flux created by electrical energy in the primary winding, and means for varying the amount of flux so shunted from each of said secondary windings, each of said means functioning when the electrical energy in the primary winding has a separate predetermined frequency.

9. A coupling device comprising a magnetic core, a primary winding wound upon said core, a secondary winding wound upon said core, and means associated with said secondary winding whereby said coupling device will pass electrical energy of a frequency approaching either of two predetermined frequencies and will substantially shut out all electrical energy of a frequency removed from said predetermined frequencies.

10. A coupling device, comprising a magnetic core, a primary winding wound upon said core, a secondary winding wound upon said core, and means associated with said secondary winding whereby said coupling device will pass electrical energy of a frequency approaching either of two predetermined, slightly separated frequencies and will shut out electrical energy of a frequency between, above or below said predetermined frequencies.

ROSS GUNN.